United States Patent
Steinblatt

[11] Patent Number: 5,708,736
[45] Date of Patent: Jan. 13, 1998

[54] OPTICAL WAVEGUIDE MODE COUPLING USING MECHANICAL WAVE INTERFERENCE

[75] Inventor: Serge Steinblatt, Ra'anana, Israel

[73] Assignee: Scitex Corporation LTD., Herzlia, Israel

[21] Appl. No.: 367,916

[22] Filed: Jan. 3, 1995

Related U.S. Application Data

[63] Continuation of Ser. No. 267,045, Jun. 28, 1994, abandoned.

[30] Foreign Application Priority Data

Jun. 30, 1993 [IL] Israel ........................... 106,185

[51] Int. Cl.⁶ ........................................... G02B 6/26
[52] U.S. Cl. ........................... 385/28; 385/27; 385/4; 385/7; 385/42
[58] Field of Search ........................... 385/1–4, 7, 13, 385/24, 27, 28, 29, 36, 50, 42, 37

[56] References Cited

U.S. PATENT DOCUMENTS

| | | | |
|---|---|---|---|
| 3,753,157 | 8/1973 | Ash et al. | 385/28 |
| 4,026,632 | 5/1977 | Hill et al. | 385/28 |
| 4,067,643 | 1/1978 | Sugimura et al. | 385/28 |
| 4,735,476 | 4/1988 | Heffner et al. | 385/123 X |
| 4,792,207 | 12/1988 | Shaw et al. | 385/28 X |
| 4,793,676 | 12/1988 | Risk | 385/28 |
| 4,861,128 | 8/1989 | Ishikawa et al. | 385/28 |
| 4,867,517 | 9/1989 | Rawson | 385/24 |
| 4,895,421 | 1/1990 | Kim et al. | 385/28 X |
| 5,018,814 | 5/1991 | Jannson et al. | 385/28 X |
| 5,022,732 | 6/1991 | Engan et al. | 385/28 |
| 5,135,295 | 8/1992 | Jen et al. | 385/13 |

FOREIGN PATENT DOCUMENTS

| | | | |
|---|---|---|---|
| 0192887 | 11/1985 | European Pat. Off. | G02F 1/01 |
| 0346024 | 6/1989 | European Pat. Off. | G02B 6/28 |
| 3543510 | 12/1985 | Germany | G02B 6/10 |

OTHER PUBLICATIONS

Anonymous Research Disclosure 25839, Acousto–Optic Fiber Modulations, Oct. 1985.

Kino, G. S. et al., Acoustic Modulators for Optical Fibres, Revue de Physique Appliquee 20, Jun. 1985, Paris, France.

*Primary Examiner*—Brian Healy
*Attorney, Agent, or Firm*—Ladas & Parry

[57] ABSTRACT

Apparatus for mode coupling in a waveguide that includes an engagement substrate arranged for intimate contact with a waveguide, and at least two actuators coupled to the engagement substrate and operative to create an interference pattern in the engagement substrate for producing a periodic deformation of the waveguide.

16 Claims, 3 Drawing Sheets

OPTICAL WAVEGUIDE MODE COUPLING USING MECHANICAL WAVE INTERFERENCE

This is a continuation of application Ser. No. 08/267,045 filed on Jun. 28, 1994, now abandoned.

FIELD OF THE INVENTION

The present invention relates to waveguides and mode coupling therein and more particularly to fiber optic mode coupling.

BACKGROUND OF THE INVENTION

Various techniques have been proposed for active mode coupling in and intensity modulation of optical fibers. U.S. Pat. No. 5,135,295 describes fiber optic piezoelectric devices comprising optical fibers coated with thin piezoelectric and ferroelectric films. U.S. Pat. No. 5,022,732 describes a fiber optic intermode coupling single sideband frequency shifter in which a traveling acoustic wave is employed for mode coupling.

An anonymous research disclosure No. 25839 entitled Acousto-Optic Fiber Modulations, published in October, 1985 describes the use of an acoustic wave to modulate the refractive index of the core of an optical fiber.

SUMMARY OF THE INVENTION

The present invention seeks to provide improved apparatus and a technique for active mode coupling in and intensity modulation of a waveguide.

There is thus provided, in accordance with a preferred embodiment of the present invention, apparatus for mode coupling in a waveguide that includes an engagement substrate arranged for intimate contact with a waveguide, and at least two actuators coupled to the engagement substrate and operative to create an interference pattern in the engagement substrate for producing a periodic deformation of the waveguide.

There is also provided, in accordance with a preferred embodiment of the present invention, a method for mode coupling in a waveguide that includes the steps of arranging an engagement substrate in intimate contact with a waveguide, and creating an interference pattern in the engagement substrate for producing a periodic deformation of the waveguide.

In accordance with a preferred embodiment of the present invention, the interference pattern is a mechanical wave interference pattern and preferably an acoustic wave interference pattern.

In accordance with a preferred embodiment of the invention, the waveguide is an optical fiber.

In accordance with a preferred embodiment of the invention, the apparatus for mode coupling is operative to couple guided light to the radiation mode of the waveguide, thereby providing intensity modulation of radiation passing therealong.

In accordance with another preferred embodiment of the invention, the apparatus for mode coupling is operative to couple guided light of a first waveguide to the guided modes of at least one other waveguide, thereby providing an amplitude or power coupler.

In accordance with a preferred embodiment of the invention, the waveguides are optical fibers.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
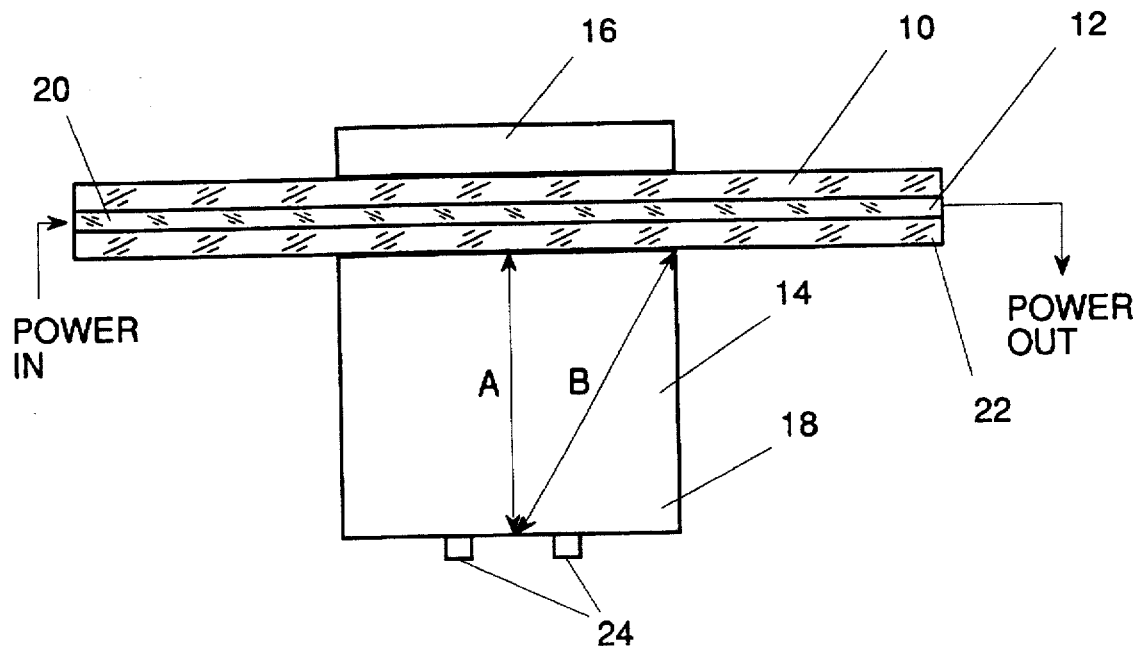
FIGS. 1A and 1B are exaggerated illustrations of apparatus for mode coupling between guided modes or guided and radiation modes in a waveguide, constructed and operative in accordance with a preferred embodiment of the present invention, and in respective de-energized and energized states.
Figure 1B:
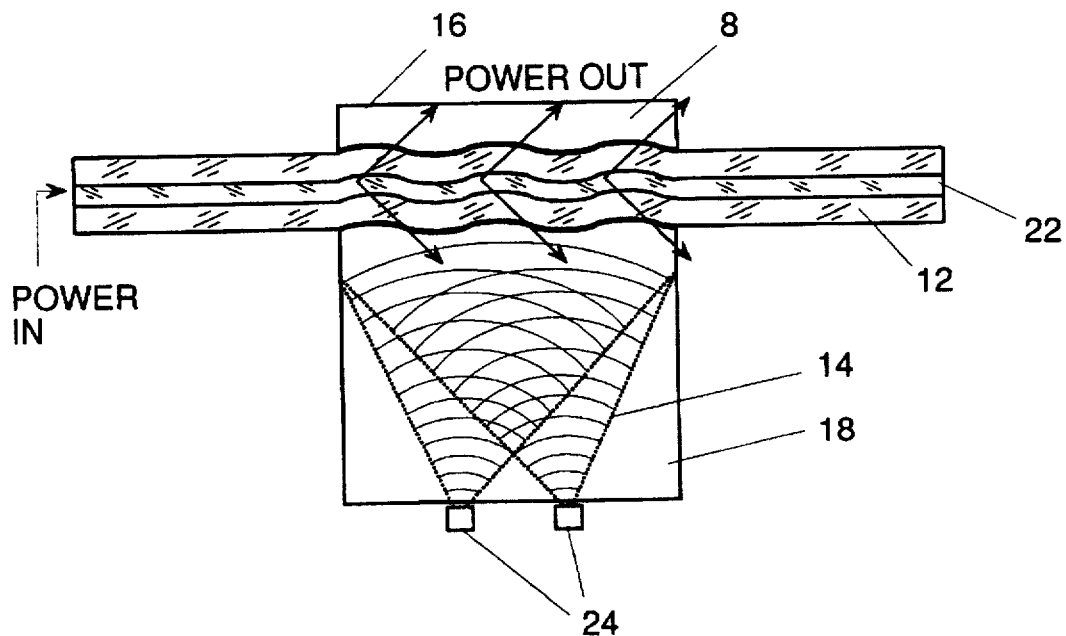

Reference is now made to FIGS. 1A and 1B, which illustrate apparatus for mode coupling of a single waveguide. FIGS. 1A and 1B illustrate a waveguide which is an optical fiber, it being appreciated that the present invention may be applicable to any other suitable type of waveguide, such as slab waveguides used in integrated optics technology.

In the illustrated embodiment, an optical fiber 10 having a core 12 is intimately coupled to an engagement substrate 14. Preferably, the engagement substrate 14 may be made of two parts 16 and 18, so as to enable pressure engagement of the optical fiber 10 between the two parts. The optical fiber 10 typically transmits power or optical signals from a first end thereof 20, via the engagement substrate 14, to a second end thereof 22.

In accordance with a preferred embodiment of the invention, at least two actuators 24 are operatively engaged with the engagement substrate 14. Actuators 24 are preferably piezoelectric transducers, and they are operated preferably at the same frequency and in a phase relationship, so as to produce an interference pattern, as seen in FIG. 1B.

In accordance with a preferred embodiment of the present invention, the interference pattern is a mechanical wave interference pattern, preferably, an acoustic wave interference pattern. This interference pattern produces periodic spatial deformations in the surfaces of the engagement substrate 14, which intimately engage the waveguide 10, and thus produce corresponding deformations in the waveguide. The phase between the actuators 24 is preferably held constant, although not necessarily at any particular value, so that the spatial deformations do not vary over time. The deformations are shown in greatly exaggerated form in FIG. 1B.

As a result of the deformations produced in the waveguide, part of the power and signal content passing along the waveguide 10 is caused to be radiated outwardly from the waveguide and not to reach waveguide end 22.

FIG. 1B illustrates mode coupling of guided modes to radiation modes. In this case, the power reaching the end 22 is reduced and the apparatus of the present invention operates as an amplitude or power modulator. Alternatively, the mode coupling can be of guide modes to guide modes, e.g., low order modes to higher order modes. The apparatus of the invention then functions as a mode scrambler. As a further alternative, the mode coupling can couple forward and backwards propagation modes.

Figure 2A:
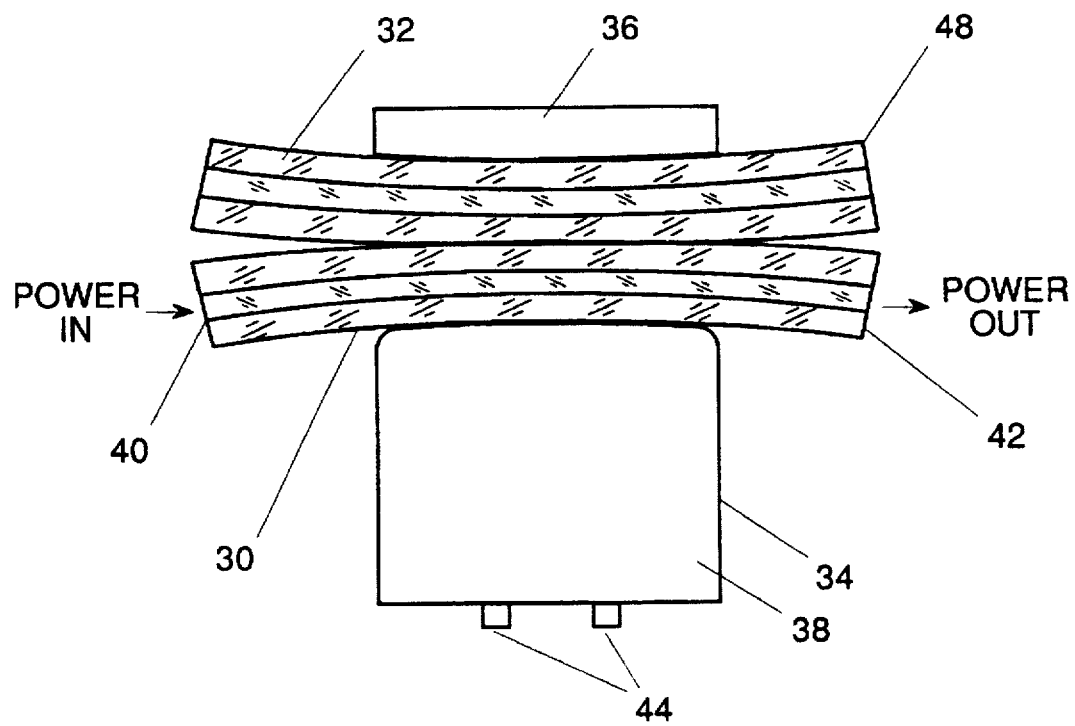
FIGS. 2A and 2B are exaggerated illustrations of apparatus for mode coupling between waveguides, constructed and operative in accordance with a preferred embodiment of the present invention, and in respective de-energized and energized states.
Figure 2B:
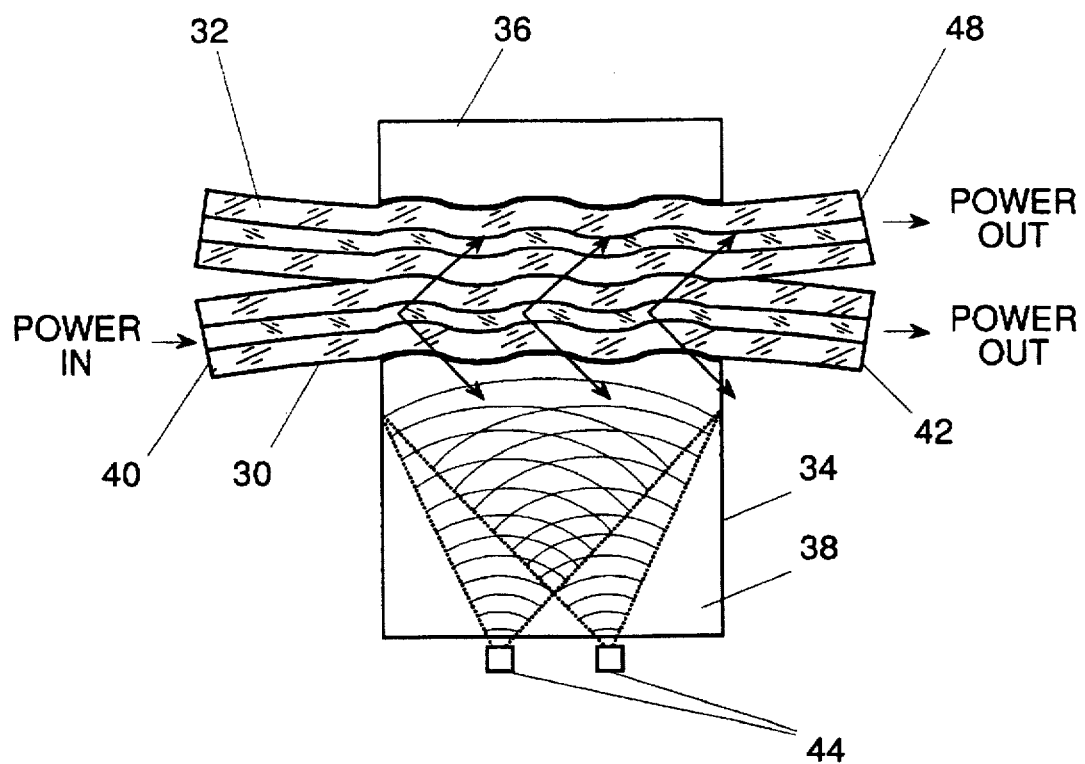

Reference is now made to FIGS. 2A and 2B, which illustrate apparatus for mode coupling between waveguides.

As in FIGS. 1A and 1B, FIGS. 2A and 2B illustrate waveguides which are optical fibers, it being appreciated that the present invention may be applicable to any other suitable type of waveguide, such as slab waveguides used in integrated optics technology.

In the illustrated embodiment, a pair of optical fibers 30 and 32 are intimately coupled to an engagement substrate 34 and to each other. As in the embodiment of FIGS. 1A and 1B, preferably the engagement substrate 34 is made of two parts 36 and 38, so as to enable pressure engagement of the optical fibers 30 and 32 between the two parts. The optical fiber 30 typically transmits power or optical signals from a first end thereof 40, via the engagement substrate 34, to a second end thereof 42.

In accordance with a preferred embodiment of the invention, at least two actuators 44 are operatively engaged with the engagement substrate 34. Actuators 44 are preferably piezoelectric transducers, and they are operated preferably at the same frequency and in a phase relationship, so as to produce an interference pattern, as seen in FIG. 2B.

In accordance with a preferred embodiment of the present invention, the interference pattern is a mechanical wave interference pattern, preferably, an acoustic wave interference pattern. This interference pattern produces periodic spatial deformations in the surfaces of the engagement substrate 34, which intimately engage the waveguides 30 and 32 and thus produce corresponding deformations in the waveguides. The phase between the actuators 44 is preferably held constant, although not necessarily at any particular value, so that the spatial deformations do not vary over time. The deformations are shown in greatly exaggerated form in FIG. 2B.

As a result of the deformations produced in the waveguides, part of the power and signal content passing along the waveguide 30 is caused to be coupled to and thus transmitted to waveguide 32.

FIG. 2B illustrates mode coupling of guided modes of waveguide 30 to radiation modes, and then in turn, to the guided modes of waveguide 32. In this case, the power reaching the end 42 is reduced by an amount somewhat in excess of the amount of power which is transmitted to waveguide 32 and which reaches end 48 thereof. Here the apparatus of the present invention operates as an amplitude or power coupler.

It is to be appreciated that the multiple waveguide coupling illustrated in FIGS. 2A and 2B is not limited to two waveguides and may operate with any suitable number or configuration of waveguides.

Figure 3:
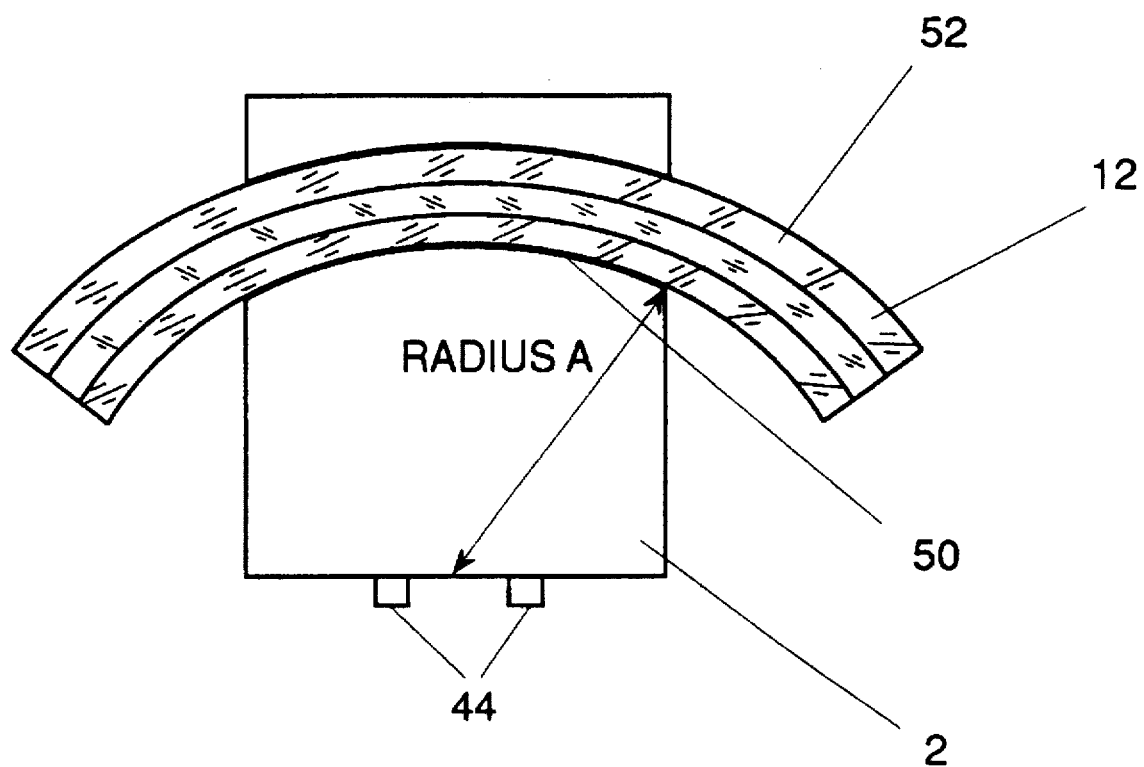
FIG. 3 is an illustration of an alternative arrangement of apparatus of the type shown in FIGS. 1A–1B or FIGS. 2A–2B.

Reference is now made to FIG. 3, which illustrates the apparatus of the type shown in FIGS. 1A–1B or 2A–2B, having a curved engagement surface 50 for intimate engagement with a waveguide 52, such as an optical fiber. The provision of such a curved engagement surface 50 increases the effective length of the engagement surface.

Moreover, the bandwidth of the apparatus is also increased, since the bandwidth is related to the difference between the distance from the actuators to the middle of the interaction region (distance A in FIG. 1A) and the distance from the actuators to the edge of the interaction region (distance B in FIG. 1A).

Referring to FIG. 3, the curved engagement surface with a radius A reduces this difference in distance, thus improving the bandwidth of the apparatus.

It will be appreciated by persons skilled in the art that the present invention is not limited by what has been particularly shown and described hereinabove. Rather the scope of the present invention is defined only by the claims which follow:

I claim:

1. Apparatus for mode coupling in a waveguide comprising:
    an engagement substrate arranged for intimate contact with at least one waveguide; and
    at least two actuators coupled to the engagement substrate and operative to generate acoustic waves propagating across said at least one waveguide, thereby to create an interference producing a spatially transverse periodic deformation in said at least one waveguide, said periodic deformation providing said mode coupling,
    wherein said at least two actuators and said at least one waveguide are generally aligned in the same plane.
2. Apparatus according to claim 1 and also comprising at least one waveguide.
3. Apparatus according to claim 2 and wherein at least one waveguide comprises a plurality of waveguides and the apparatus is operative to couple energy from at least one of said plurality of waveguides to at least another of said plurality of waveguides.
4. Apparatus according to claim 1 and wherein said at least one waveguide comprises at least one optical fiber.
5. Apparatus according to claim 1 and wherein said apparatus for mode coupling is operative to couple energy to the radiation mode of the waveguide, thereby providing intensity modulation of radiation passing therealong.
6. Apparatus according to claim 1 and wherein said engagement substrate defines a generally straight engagement surface for engagement with said waveguide.
7. Apparatus according to claim 1 and wherein said engagement substrate defines a generally curved engagement surface for engagement with said waveguide.
8. Apparatus according to claim 1 and wherein said interference pattern is a mechanical wave interference pattern.
9. Apparatus according to claim 1 and wherein said interference pattern is an acoustic wave interference pattern.
10. A method for mode coupling in a waveguide including the steps of:
    arranging an engagement substrate in intimate contact with at least one waveguide; and
    generating acoustic waves propagating across said at least one waveguide, thereby creating an interference producing a spatially transverse periodic deformation in said at least one waveguide, said periodic deformation providing said mode coupling.
11. A method according to claim 10 and wherein at least one said waveguide comprises a plurality of waveguides and said creating step is operative to couple energy from at least one of said plurality of waveguides to at least another of said plurality of waveguides.
12. A method according to claim 10 and wherein at least one said waveguide is an optical fiber and said arranging step is operative to engage intimately said optical fiber along a generally straight path.
13. A method according to claim 10 and wherein at least one said waveguide is an optical fiber and said arranging step is operative to engage intimately said optical fiber along a generally curved path.
14. A method according to claim 10 and wherein said creating step is operative to couple energy to the radiation mode of the waveguide, thereby providing intensity modulation of radiation passing therealong.
15. A method according to claim 10 and wherein said interference pattern is a mechanical wave interference pattern.
16. A method according to claim 10 and wherein said interference pattern is an acoustic wave interference pattern.

* * * * *